May 18, 1954  G. B. REEVES  2,678,733
STRAINING APPARATUS
Filed Dec. 15, 1950  3 Sheets-Sheet 1
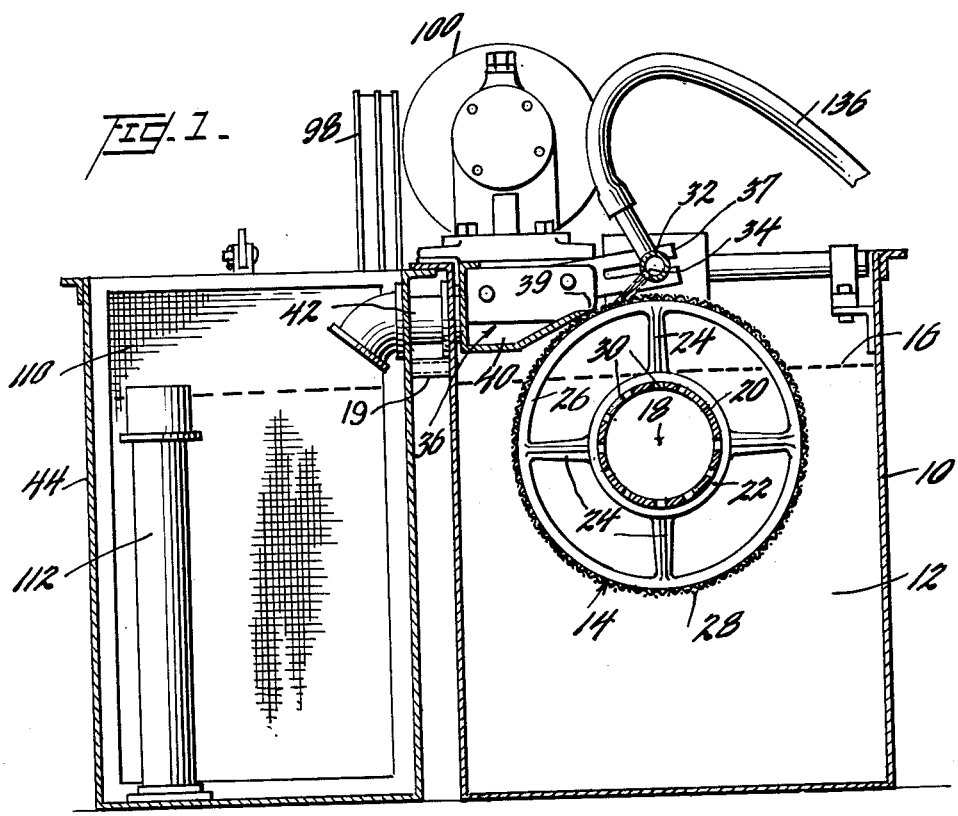
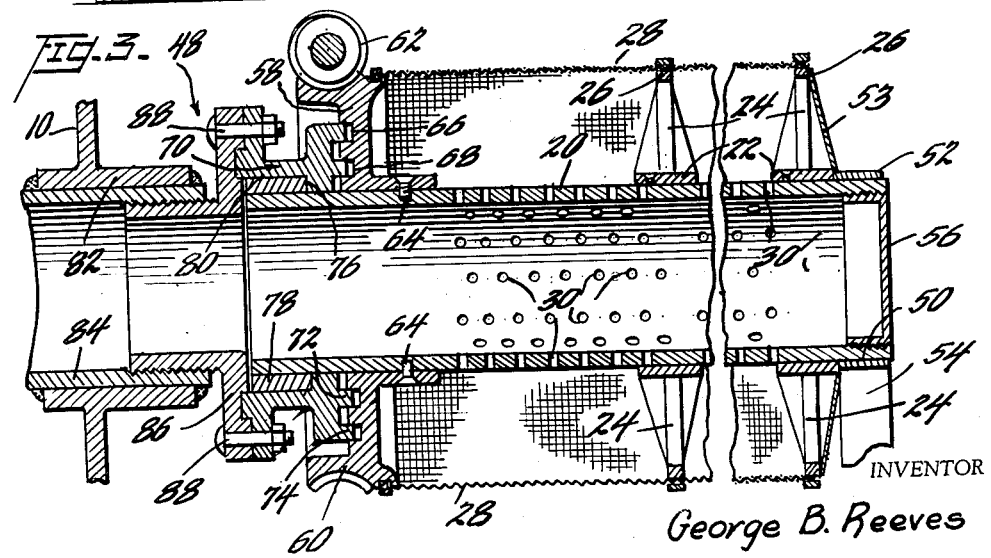
INVENTOR
George B. Reeves
BY Cushman, Darby & Cushman
ATTORNEYS

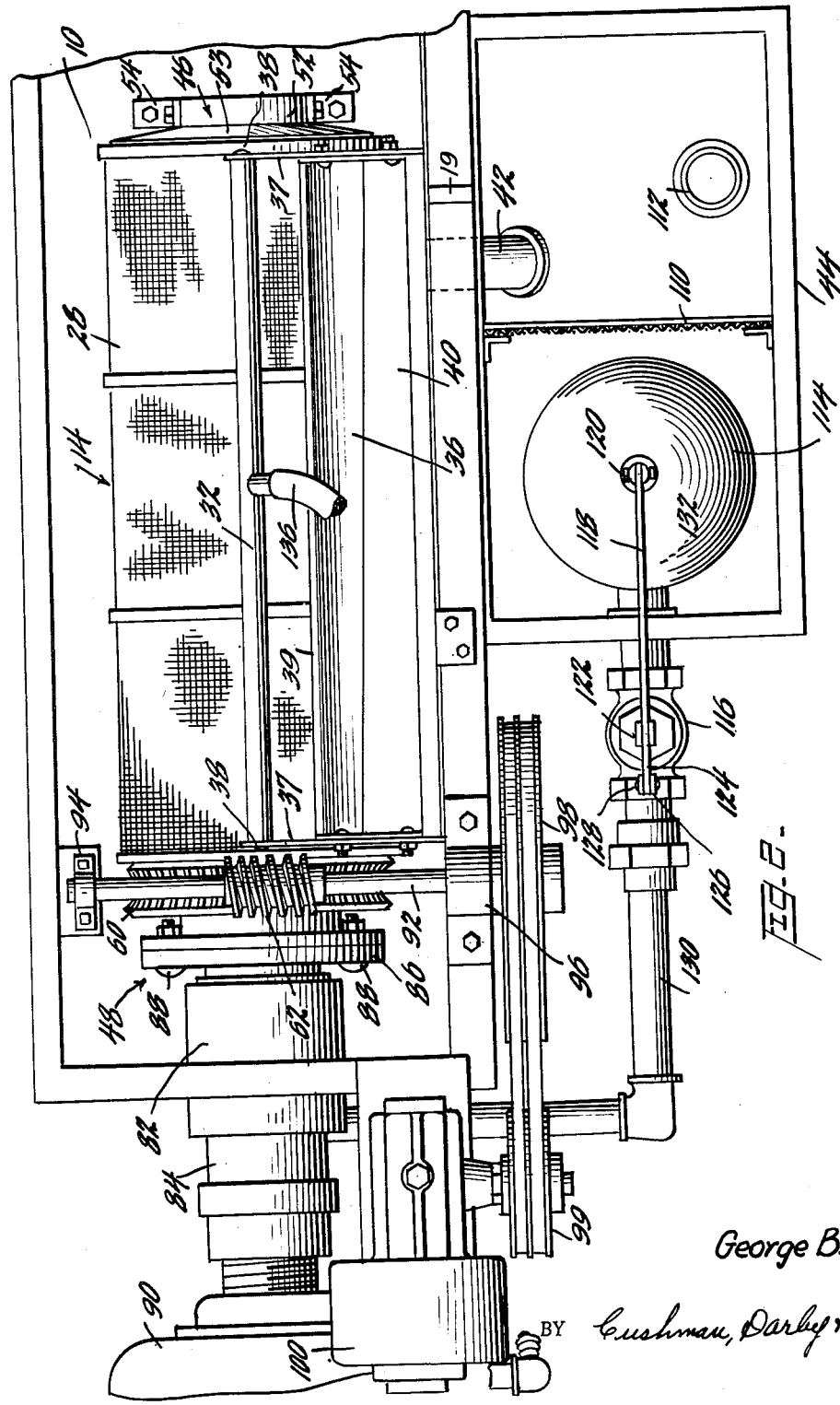

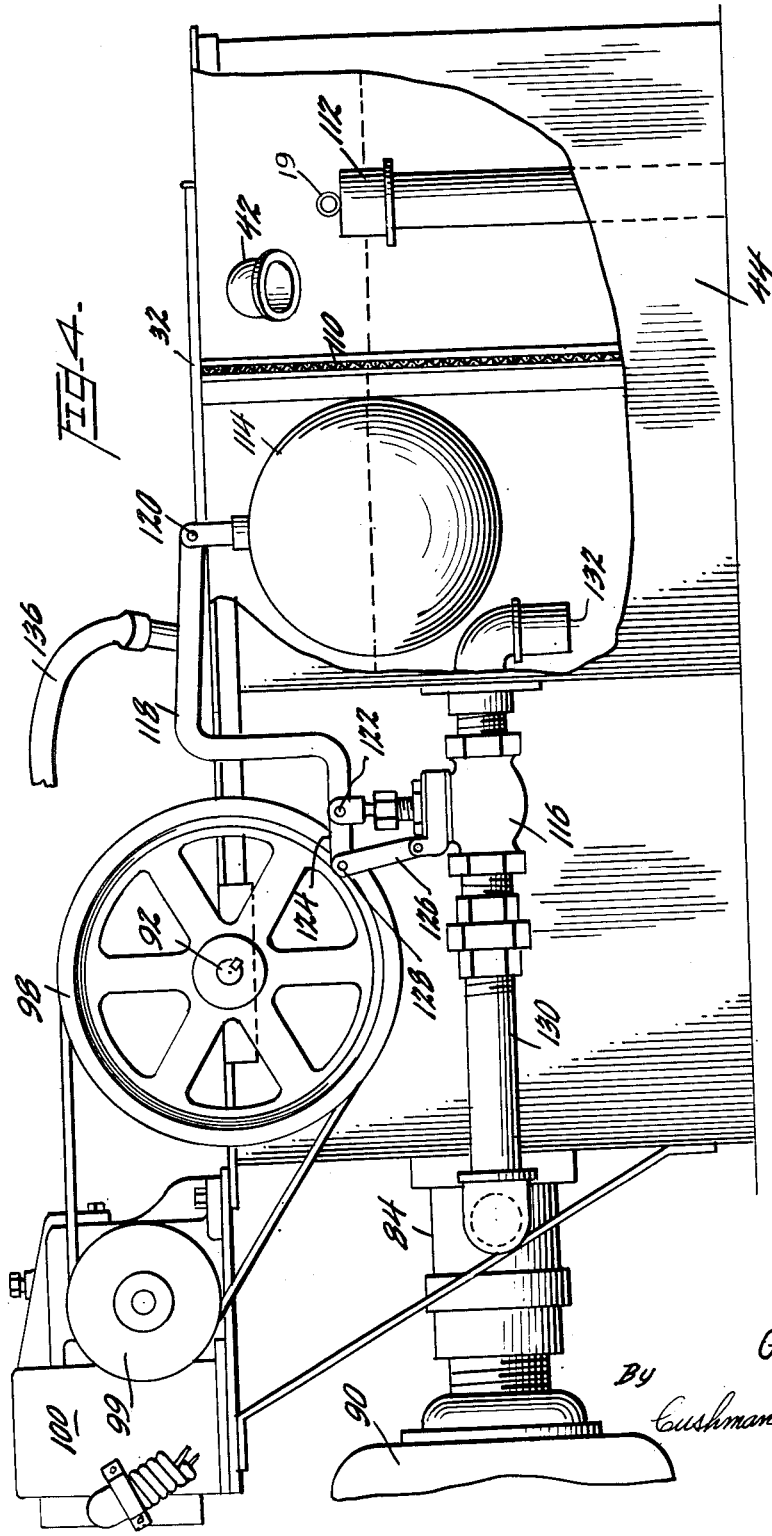

Patented May 18, 1954

2,678,733

UNITED STATES PATENT OFFICE 2,678,733

STRAINING APPARATUS

George B. Reeves, Fairfax, Ala., assignor to West Point Manufacturing Company, Shawmut, Ala., a corporation of Alabama Application December 15, 1950, Serial No. 200,972

3 Claims. (Cl. 210—199)

This invention relates to apparatus for removing particles of material from fluid mediums.

Heretofore in systems such as air conditioning systems no satisfactory methods have been known to continuously remove particles from fluids such as water. For example, in cleaning air in textile plants, it is often the custom to circulate the air in the plant through a washing station where the considerable quantities of lint and like particles in the air are placed in suspension in water. Heretofore, the water containing such suspensions of lint and other particles has been circulated through a series of stationary screens. This has required that periodically the screens had to be removed from the ducts in which the water was circulated so that the retained particles could be removed by hand. This was a very expensive and time-consuming operation, inasmuch as the screens were of extensive area. Moreover, if not cleaned regularly, they would clog the complete system.

By my invention, disclosed in this specification, I provide a continuously moving strainer through which the fluid containing the particles is moved. Preferably, the movable strainer takes the form of a cylinder and this cylinder is placed horizontally in the fluid with a small portion of its periphery above the surface of the fluid. The strainer is then slowly rotated as the fluid is drawn inwardly through the strainer and exhausted through an axial outlet. The lint or other particles which are retained on the surface of the strainer below the level of the fluid may then be removed into a receptacle when the surface is above the fluid.

Accordingly, the primary object of my invention is to provide apparatus for continuously removing particles from fluid.

A further object of my invention is to provide apparatus for continuously removing particles from fluid, in which fluid used for washing may be recirculated.

Further objects and the entire scope of my invention will be further understood from the following detailed description and from the appended claims.

A complete understanding of my invention may be had with reference to the accompanying drawings in which:

Fig. 1 shows an end view of the apparatus.

Figure 2 shows a plan view of the apparatus.

Figure 3 shows the details of mounting the cylindrical strainer employed in my invention.

Figure 4 shows a side view of the structure of my invention.

Referring now to Figure 1, a suitable first tank 10 is provided into which is introduced a body of fluid 12 which contains relatively small particles, usually in suspension in the liquid. A cylindrical strainer 14 is supported partially beneath the surface 16 of the fluid 12 and this cylindrical strainer is arranged to rotate counterclockwise about a central axis, designated as 18. The surface 16 may be controlled by any suitable means, for example by a common overflow pipe 19 discharging into the adjacent tank. The cylindrical strainer 14 is comprised of an inner supporting tubular member 20 which is rotatably supported in a manner which will be hereinafter described. Surrounding the tubular member 20 at spaced points along the length thereof are spiders 22 having extending legs 24 which support an integral outer ring 26. Wire mesh or other suitable screening 28 is then supported upon the just-mentioned ring 26 to form a continuous cylindrical straining surface. The tubular member 20 is provided with a plurality of apertures 30 so that fluid which is first drawn in through the screen 28 may also pass into the interior of the tubular member.

From the apparatus as thus far described, it will be apparent that if the suction side of suitable pumping means is connected to the interior of the tubular member 20, fluid from the tank 10 will be drawn inwardly through the screening 28 at all points of the latter which are beneath the surface 16 of the fluid 12. Accordingly, the particles in the fluid will be retained on the screen 28. Then, if the cylindrical strainer is revolved counterclockwise, as viewed in Figure 1, the retained particles on the screening 28 will travel above the surface 16 of fluid body 12.

Adjacent the uppermost portion of the cylindrical strainer 14 there is positioned a fluid header 32. This header is preferably an elongated tubular member having an elongated opening 34 in such position that fluid under pressure in the header will be directed at a relatively high velocity to the surface of screening 28. Preferably the fluid will impinge upon the screening in a plane substantially tangent thereto. Accordingly, the jet of fluid issuing from the opening 34 will perform the function of washing all of the particles from the outer surface of screening 28 into a collector tray 36. The header 32 is conveniently mounted for adjustment by means of slotted arms 37 extending from suitable mounts on tank 10. The ends of header 32 may be provided with plugs drilled to receive screws 38. The screws 38 may then be tightened after header 32 has been suitably rotated and positioned along arms 37. The tray 36 is provided with a relatively sharp edge 39 which is so positioned that a minimum clearance is established between this edge and the screening 28. Accordingly, substantially all of the particles which are removed from the screening 28 by means of the fluid jet issuing from opening 34 will be washed over the edge 39 and into the lowermost section 40 of the tray 36. Nearly all of the fluid from the opening 34 will, of course, also appear in the tray 36. The combined washing fluid and the particles may then be transferred through a pipe 42 into a particle-retaining second tank 44.

Referring now to Figures 2 and 3, the arrangement for suitably mounting the cylindrical strainer 14 may be understood in greater detail. In Figure 2, it will be observed that the cylindrical strainer 14 is rotatably mounted between a right hand bearing indicated generally as 46 and a left hand combined bearing and fluid coupling arrangement designated generally as 48. Referring first to bearing 46 in Figure 3, it will be observed that the tubular member 20 extends a short distance beyond the end spider 22 to form a bearing surface 50. A ring 52 is then adapted to surround the bearing surface 50 and the ring is fixedly supported in any suitable manner by uprights 54 which extend from the bottom of the tank 10. Fluid may be prevented from entering the strainer 14 through the end spider 22 by means of a plate 53 secured to the outer side of the legs 24 of the end spider.

The end of the tubular member 20 may be plugged by the insertion of a threaded plug member 56.

Referring now to the combined bearing and fluid coupling 48 at the other end of the tubular member 20, there is mounted on member 20 an annular ring structure 58 which has formed integrally therewith a worm wheel 60. The ring structure 58 is fixedly attached to the tubular member 20 by set screws 64. Cooperating with the worm wheel 60 is a worm gear 62 which is employed to rotate the cylindrical strainer.

The ring structure 58 is provided with two concentric annular grooves 66 and 68 which are employed in combination with a gland ring 70 to prevent fluid from entering the rotatable joint. This sealing function is carried out by two annular rings 72 and 74 which are a part of the gland ring 70 and which fit snugly into the grooves 66 and 68, respectively. A bearing support between the tubular member 20 and the gland ring 70 is also provided by a shoulder 76 formed as part of the gland ring. A bushing 78 may also be provided to ride between the extreme end of the tubular member 20 and an intermediate portion 80 of the gland ring 70.

The glad ring 70 is fixedly mounted to the supporting structure in the following manner: In the side panel of the tank 10 there is provided a sleeve 82 which may be attached to an aperture in the tank 10 by any suitable means, such as by welding. Within the sleeve 82 there is provided a pipe 84 which may also be welded to the sleeve 82. The pipe 84 may terminate substantially at the inner end of the sleeve 82 and this end of the pipe 84 is threaded internally. A flange 86 is then provided which may be threaded to fit into the just-mentioned end of pipe 84. A fixed connection is then provided between the flange 86 and the gland ring 70 by means of a series of bolts 88 located about the periphery of the respective members.

From the structure as thus far described, it will be apparent that as the worm gear 62 is revolved its cooperation with the worm wheel 60 will cause the ring structure 58 to revolve, and the tubular member 20 attached thereto by means of set screws 64 will also revolve. Because of the grooves 66, 68 and cooperating ring 72, 74, as well as the shoulder 76, substantially no fluid will be able to enter the interior of tubular member 20 and pipe 24 through this coupling.

Referring now particularly to Figure 2, the pipe 84 may extend to the input or suction side of a centrifugal pump 90. The worm gear 62 is mounted on a shaft 92 which extends between suitable bearings 94 and 96 mounted on the sides of the tank 10. The shaft 92 extends beyond the bearing 96 to receive a suitable pulley 98 and this pulley is driven through suitable belting by a pulley 99, which in turn is driven by a gear reduction motor 100. Because of the reduction in speed in the geared motor 100, in the belt drive and in the worm gear and worm ring, the motor 100 may operate at conventional speed (about 1800 revolutions per minute) and yet the cylindrical strainer 14 will revolve at only about 1¼ revolutions per minute.

As previously stated, the water combined with lint, which is delivered through the pipe 42, may be directly discharged into a suitable waste system. However, it may often be preferable to conserve the supply of washing fluid by removing the lint and re-circulating this fluid back into a main supply system. For this purpose, I provide the previously-mentioned tank 44. This tank is divided into two sections by means of a screen 110, thereby in effect creating a third tank separated from the aforesaid second tank by screen 110. A stand pipe 112 extends upwardly into tank 44 in the first section thereof, this being the section into which the pipe 42 exhausts. Stand pipe 112 is adapted for connection to a suitable waste system, and the fluid which is emptied into this section of the tank 44 will flow outwardly through the screen 110 until the latter becomes clogged with particles. Normally, the screen 110 will then be cleaned. However, if the cleaning of this screen should be neglected, then the fluid issuing from pipe 42, together with the particles therein, will simply wash down the stand pipe 112. In other words, even if screen 110 is neglected, the main cleaning operation in tank 10 will not be interrupted. Moreover, the lint will be concentrated at screen 110 and may be cleaned very quickly, which is a decided advantage over the previous methods of cleaning very extensive screens.

In normal practice, it will be desirable to prevent fluid from washing down the stand pipe 112 and yet as much as possible of the area of screen 110 should be utilized. Accordingly, I provide a float-controlled valve operating from the second section of tank 44, that is from the third tank to maintain the level of fluid just beneath the top of stand pipe 112. This float, designated as 114, may be a hollow sphere interconnected with any conventional valve 116 by means of arm 118. Arm 118 may be firmly attached to the float 114 by bolt 120, and may be connected with the valve 116 by means of pin 122. To provide leverage on the stem of the valve, the arm 118 may extend as at 124 and be pivotally connected to one end of a connecting arm 126 by means of pivot pin 128. The other end of arm 126 may be fixedly attached to the valve casing as shown.

The valve 116 is placed in a pipe line 130 which has one of its ends 132 opening into the lower portion of the tank 44 and has its other end opening into the pipe 84. Accordingly, since pipe 84 leads to the intake side of pump 90, fluid in the tank 44 is re-inserted in the main fluid system. It will be clear from the foregoing that the float 114 will serve to maintain the level of fluid in tank 44 just beneath the top of stand pipe 112, unless the screen 110 should become clogged. As previously stated, the object of controlling the fluid level is to utilize the complete area of screen 110. Also, some fluid will always be present to prevent air from entering the pump 90.

The bottom 40 of the tray 36 may be conveniently sloped toward the opening of pipe 42 so that all the material washed into the tray along the length of the cylindrical strainer 14 will continually drain into this pipe. This construction may be best understood from Figure 1 which shows the end of tray 36 opposite the opening of pipe 42 to be somewhat higher than the bottom of the tray at the pipe.

Fluid may be supplied to the washing header 32 by means of a flexible hose 136. The fluid to be supplied to hose 136 is preferably obtained from the output side of the pump 90.

While the removal of particles by washing is a preferred embodiment, nevertheless, it will be apparent that particles may be removed by vacuum means from the non-submerged portions of the straining screen 28.

I am also aware that many other embodiments of my invention will be apparent to others. Therefore, I do not intend the foregoing detailed description to limit the scope of my invention. The true scope of the invention is to be determined from the appended claims.

I claim:

1. In apparatus for continuously removing particles from liquids, a straining member, pump means to move particle-laden liquid through a portion of the surface of the straining member in a direction from one side of the surface to the other and preventing reverse movement thereof, means to move the straining member relative to the path of particle-laden liquid so that portions of the surface are moved out of the said path, and cleaning means positioned adjacent the surface of the straining member out of the said path of particle-laden liquid, said cleaning means comprising means to produce a spray of a washing medium substantially tangential to the surface of the straining member and being adapted to remove retained particles adhering to the said one side of the strainer surface, tray means to receive the washing medium and particles removed thereby from the surface of the strainer member, and stationary screen means to collect particles in the washing medium, to effect recirculation and reuse of said medium in a washing cycle.

2. Apparatus for continuously removing particles from liquid comprising, a first tank adapted to contain a body of particle-laden liquid, a cylindrical straining member, means to mount the straining member for rotation about its axis, an elongated header member positioned adjacent the upper side of the cylindrical surface of the strainer member, said header member being longitudinally slit whereby cleaning liquid is forced therefrom under pressure to impinge substantially tangentially upon the outer surface of the strainer member, a tray member having an edge positioned adjacent the surface of the strainer member, the said tray being arranged so that cleaning liquid will deflect from the surface over the said edge and into the tray, means to control the level of particle-laden liquid in the said first tank so that only the lower portions of the strainer member are submerged, pump means connected to one end of the strainer to move liquid into the strainer member through the cylindrical surface thereof into the interior of the cylindrical surface and to prevent reverse movement of liquid therethrough, means to rotate the strainer member, whereby particles retained on the submerged portions of the strainer member will be continuously removed into the tray member by the cleaning liquid as the strainer member is rotated, a second tank into which the cleaning liquid and particles carried thereby are discharged, one side of said second tank comprising a screen, and a waste pipe opening into the second tank a substantial distance above the bottom thereof.

3. Apparatus as in claim 2, and further including a third tank communicating with the second tank through the said screen, means to discharge liquid from the third tank into a main supply of liquid, and float means adapted to maintain the level of liquid in the second and third tanks just below the level of the waste pipe opening and above the discharge to the main liquid supply.

References Cited in the file of this patent

UNITED STATES PATENTS

| Number | Name | Date |
|---|---|---|
| 839,591 | Huntley | Dec. 25, 1906 |
| 949,724 | Bebbington | Feb. 15, 1910 |
| 1,131,243 | Hughes | Mar. 9, 1915 |
| 1,151,999 | Bird | Aug. 31, 1915 |
| 1,212,978 | Malone | Jan. 16, 1917 |
| 1,368,618 | Faber | Feb. 15, 1921 |
| 1,577,584 | Miller, Jr. | Mar. 23, 1926 |
| 2,139,096 | Piquerez | Dec. 6, 1938 |